US012002321B2

(12) United States Patent
Jadeja et al.

(10) Patent No.: US 12,002,321 B2
(45) **Date of Patent: *Jun. 4, 2024**

(54) CURVED BUTTON DECK DISPLAY

(71) Applicant: Aristocrat Technologies Australia Pty Ltd., North Ryde (AU)

(72) Inventors: Rajendrasinh B. Jadeja, Las Vegas, NV (US); Bruce Urban, Las Vegas, NV (US)

(73) Assignee: Aristocrat Technologies Australia Pty Limited, North Ryde (AU)

(*) Notice: Subject to any disclaimer, the term of this patent is extended or adjusted under 35 U.S.C. 154(b) by 287 days.

This patent is subject to a terminal disclaimer.

(21) Appl. No.: 16/946,510

(22) Filed: Jun. 24, 2020

(65) Prior Publication Data

US 2020/0327773 A1 Oct. 15, 2020

Related U.S. Application Data

(63) Continuation of application No. 16/209,900, filed on Dec. 4, 2018, now Pat. No. 10,741,009.

(51) Int. Cl.
*G07F 17/32* (2006.01)
*G07F 17/42* (2006.01)

(52) U.S. Cl.
CPC ...... *G07F 17/3211* (2013.01); *G07F 17/3206* (2013.01); *G07F 17/3209* (2013.01); *G07F 17/3239* (2013.01); *G07F 17/42* (2013.01)

(58) Field of Classification Search
CPC ............. G07F 17/3211; G07F 17/3206; G07F 17/3209; G07F 17/3239; G07F 17/42
See application file for complete search history.

(56) References Cited

U.S. PATENT DOCUMENTS 1,570,368 A 1/1926 Zeh
D370,058 S 5/1996 Bostrom
(Continued)

FOREIGN PATENT DOCUMENTS

EA 0005357520001 7/2006
JP D1589479 10/2017
JP D1601936 4/2018

OTHER PUBLICATIONS

Office Action dated Oct. 6, 2021 for U.S. Appl. No. 29/788,408 (pp. 1-10).
(Continued)

*Primary Examiner* — Werner G Garner
(74) *Attorney, Agent, or Firm* — Weaver Austin Villeneuve & Sampson LLP

(57) ABSTRACT

A button deck for an electronic gaming machine (EGM) may have a display system that includes one or more curved display portions. A curved display portion may be curved along an axis that is substantially horizontal when the button deck module is coupled to an EGM. In some examples, a curved display portion may reside along a side of the button deck module that is near (or touching) a player when the button deck module is in use. In some implementations, a curved display portion may be proximate a gaming machine display or a player tracking module when the button deck module is coupled to the EGM. The curvature of a curved display portion may match the curvature of a gaming machine display device. At least a portion of the button deck may be configured to display images corresponding to a game theme and/or an attract sequence.

18 Claims, 9 Drawing Sheets

(56) References Cited

U.S. PATENT DOCUMENTS

| | | | | |
|---|---|---|---|---|
| D415,124 | S | 10/1999 | Rooyakkers | |
| 6,439,993 | B1 | 8/2002 | O'Halloran | |
| D481,078 | S | 10/2003 | Stephan | |
| D508,719 | S | 8/2005 | De Haas | |
| D523,092 | S | 6/2006 | Karlsson | |
| 7,364,505 | B2 | 4/2008 | Mattice | |
| D572,022 | S | 7/2008 | Mayer | |
| D572,314 | S | 7/2008 | Vallejo | |
| 7,396,282 | B2 | 7/2008 | Gauselmann | |
| D581,380 | S | 11/2008 | Derocher | |
| D587,664 | S | 3/2009 | Cometti | |
| D591,799 | S | 5/2009 | Yang | |
| D596,678 | S | 7/2009 | Myers | |
| D605,231 | S | 12/2009 | Hashimoto | |
| D622,721 | S | 8/2010 | Wood | |
| D622,780 | S | 8/2010 | Lesley | |
| D622,781 | S | 8/2010 | Lesley | |
| D635,972 | S | 4/2011 | Miyazawa | |
| 7,985,139 | B2 | 7/2011 | Lind | |
| 8,128,483 | B2 | 3/2012 | Vann | |
| D667,412 | S | 9/2012 | Wang | |
| 8,442,600 | B1 | 5/2013 | Tseng | |
| D697,558 | S | 1/2014 | Myers | |
| D700,605 | S | 3/2014 | Hong | |
| D714,270 | S | 9/2014 | Lee | |
| D714,875 | S | 10/2014 | Wudtke | |
| D715,281 | S | 10/2014 | Kim | |
| D719,116 | S | 12/2014 | Bang | |
| D719,615 | S | 12/2014 | Inoue | |
| D719,616 | S | 12/2014 | Inoue | |
| 8,951,121 | B2 | 2/2015 | Lyons | |
| D727,431 | S | 4/2015 | Themann | |
| D727,869 | S | 4/2015 | Jarema, III | |
| D730,857 | S | 6/2015 | Park | |
| D732,520 | S | 6/2015 | Themann | |
| 9,081,540 | B1 | 7/2015 | Cho | |
| D740,241 | S | 10/2015 | Kim | |
| D740,887 | S | 10/2015 | Randazzo | |
| D744,990 | S | 12/2015 | Lee | |
| D747,301 | S | 1/2016 | Lee | |
| D748,082 | S | 1/2016 | Lee | |
| 9,256,250 | B2 | 2/2016 | Raff | |
| 9,367,095 | B2 | 6/2016 | Myers | |
| D760,846 | S | 7/2016 | Castro | |
| 9,478,097 | B2 | 10/2016 | Hennessy | |
| D771,628 | S | 11/2016 | Bae | |
| 9,504,170 | B2 | 11/2016 | Rothkopf | |
| D776,654 | S | 1/2017 | Yokota | |
| D776,666 | S | 1/2017 | Karlsson | |
| D778,365 | S | 2/2017 | Kott | |
| D780,732 | S | 3/2017 | Ahn | |
| 9,614,168 | B2 | 4/2017 | Zhang | |
| D795,854 | S | 8/2017 | Kim | |
| D801,435 | S | 10/2017 | Themann | |
| D808,354 | S | 1/2018 | Castro | |
| D818,048 | S | 5/2018 | Calhoun | |
| D836,164 | S | 12/2018 | Castro | |
| D836,627 | S | 12/2018 | Xia | |
| D838,270 | S | 1/2019 | Cho | |
| 10,203,433 | B2 | 2/2019 | Yoon | |
| D842,932 | S | 3/2019 | Stair | |
| D843,466 | S | 3/2019 | Castro | |
| D843,477 | S | 3/2019 | Lesley | |
| D843,482 | S | 3/2019 | Holland | |
| D844,062 | S | 3/2019 | Lesley | |
| D846,650 | S | 4/2019 | Stair | |
| D847,109 | S | 4/2019 | Kang | |
| D847,128 | S | 4/2019 | Kim | |
| 10,303,218 | B2 | 5/2019 | Jones | |
| 10,306,783 | B2 | 5/2019 | Seo | |
| D850,536 | S | 6/2019 | Stair | |
| D858,641 | S | 9/2019 | Legras | |
| D858,642 | S | 9/2019 | Legras | |
| D862,295 | S | 10/2019 | Kim | |
| D863,122 | S | 10/2019 | Cha | |
| D865,066 | S | 10/2019 | Ortiz De Viveiros | |
| D866,667 | S | 11/2019 | Stair | |
| D868,165 | S | 11/2019 | Ortiz De Viveiros | |
| D870,818 | S | 12/2019 | Curbbun | |
| D870,820 | S | 12/2019 | Urban | |
| D871,506 | S | 12/2019 | Castro | |
| D871,507 | S | 12/2019 | Urban | |
| D873,273 | S | 1/2020 | Guacho | |
| D882,696 | S | 4/2020 | Lesley | |
| D882,697 | S | 4/2020 | Lesley | |
| D882,699 | S | 4/2020 | Bernard | |
| D882,700 | S | 4/2020 | Wudtke | |
| D883,391 | S | 5/2020 | Urban | |
| D883,393 | S | 5/2020 | Bernard | |
| 10,665,646 | B2 | 5/2020 | Yang | |
| D887,496 | S | 6/2020 | Urban | |
| D889,545 | S | 7/2020 | Jones | |
| D889,547 | S | 7/2020 | Jones | |
| D889,553 | S | 7/2020 | Glenn, II | |
| D890,849 | S | 7/2020 | Johnson | |
| 10,719,160 | B2 | 7/2020 | Lee | |
| D893,628 | S | 8/2020 | Thoeni | |
| 10,733,830 | B2 | 8/2020 | Jadeja | |
| 10,741,009 | B2 * | 8/2020 | Jadeja | G07F 17/42 |
| D898,128 | S | 10/2020 | Urban | |
| D900,088 | S | 10/2020 | Aughney | |
| 10,839,639 | B2 | 11/2020 | Demarco | |
| D904,522 | S | 12/2020 | Martin | |
| D907,120 | S | 1/2021 | Demarco | |
| D908,171 | S | 1/2021 | Demarco | |
| D908,172 | S | 1/2021 | Demarco | |
| D910,119 | S | 2/2021 | Demarco | |
| D913,378 | S | 3/2021 | Glenn, II | |
| D913,379 | S | 3/2021 | Calhoun | |
| D915,523 | S | 4/2021 | Glenn, II | |
| D918,303 | S | 5/2021 | Demarco | |
| D920,439 | S | 5/2021 | Jadeja | |
| D920,440 | S | 5/2021 | Jadeja | |
| D923,592 | S | 6/2021 | Jadeja | |
| D926,889 | S | 8/2021 | Bruzzese | |
| D931,377 | S | 9/2021 | Mcgahn | |
| D939,484 | S | 12/2021 | Son | |
| D948,621 | S | 4/2022 | Jadeja | |
| D990,442 | S | 6/2023 | Kim | |
| D980,210 | S | 7/2023 | Wu | |
| D993,203 | S | 7/2023 | Han | |
| D993,204 | S | 7/2023 | Han | |
| D998,046 | S | 9/2023 | Volkhov | |
| D999,289 | S | 9/2023 | Thompson | |
| D1,001,756 | S | 10/2023 | Park | |
| 2005/0113163 | A1 * | 5/2005 | Mattice | G07F 17/32<br>463/16 |
| 2007/0259709 | A1 * | 11/2007 | Kelly | G07F 17/3211<br>463/20 |
| 2008/0186415 | A1 | 8/2008 | Boud | |
| 2008/0188293 | A1 | 8/2008 | Rasmussen | |
| 2009/0143141 | A1 | 6/2009 | Wells | |
| 2010/0062838 | A1 * | 3/2010 | Nguyen | G07F 17/32<br>463/25 |
| 2011/0136573 | A1 | 6/2011 | Mccomb | |
| 2012/0004030 | A1 * | 1/2012 | Kelly | G07F 17/34<br>463/31 |
| 2013/0154971 | A1 | 6/2013 | Kang | |
| 2013/0217491 | A1 | 8/2013 | Hilbert | |
| 2013/0296057 | A1 * | 11/2013 | Gagner | A63F 13/2145<br>463/37 |
| 2013/0331184 | A1 | 12/2013 | Kelly | |
| 2014/0035869 | A1 | 2/2014 | Il-Kook | |
| 2014/0118271 | A1 | 5/2014 | Lee | |
| 2014/0357364 | A1 | 12/2014 | Chudek | |
| 2015/0087403 | A1 | 3/2015 | Castro | |
| 2015/0168792 | A1 | 6/2015 | Woo | |
| 2015/0201517 | A1 | 7/2015 | Bailer | |
| 2016/0048031 | A1 | 2/2016 | Gu | |
| 2016/0055703 | A1 | 2/2016 | Woels | |
| 2016/0062391 | A1 | 3/2016 | Choi | |
| 2016/0093143 | A1 | 3/2016 | Lamb | |
| 2016/0187122 | A1 | 6/2016 | Krimon | |
| 2016/0274719 | A1 | 9/2016 | Yang | |

(56) References Cited

U.S. PATENT DOCUMENTS

| | | | |
|---|---|---|---|
| 2016/0316541 | A1 | 10/2016 | Ka |
| 2016/0352878 | A1 | 12/2016 | Kim |
| 2016/0360625 | A1 | 12/2016 | Ogasawara |
| 2016/0364941 | A1 | 12/2016 | Castro |
| 2016/0364946 | A1 | 12/2016 | Castro |
| 2017/0039803 | A1 | 2/2017 | Lesley |
| 2017/0092052 | A1 | 3/2017 | Mckay |
| 2017/0118849 | A1 | 4/2017 | Kim |
| 2017/0118850 | A1 | 4/2017 | Kwon |
| 2017/0153671 | A1 | 6/2017 | Yamazaki |
| 2017/0156227 | A1 | 6/2017 | Heo |
| 2017/0178444 | A1 | 6/2017 | Lee |
| 2017/0315589 | A1 | 11/2017 | Isa |
| 2017/0318694 | A1 | 11/2017 | Yun |
| 2018/0018907 | A1 | 1/2018 | Kim |
| 2018/0078854 | A1 | 3/2018 | Achmueller |
| 2018/0136750 | A1 | 5/2018 | Namkung |
| 2018/0143669 | A1 | 5/2018 | Bok |
| 2018/0188874 | A1 | 7/2018 | Cho |
| 2018/0270975 | A1 | 9/2018 | Ishikawa |
| 2018/0276942 | A1 | 9/2018 | Whelan |
| 2018/0342129 | A1 | 11/2018 | Wudtke |
| 2019/0066433 | A1 | 2/2019 | Jadeja |
| 2019/0096169 | A1 | 3/2019 | Tovar |
| 2019/0102971 | A1 | 4/2019 | Schoonmaker |
| 2019/0102975 | A1 | 4/2019 | Lapalme |
| 2019/0150332 | A1 | 5/2019 | Son |
| 2019/0273217 | A1 | 9/2019 | Lee |
| 2019/0302849 | A1 | 10/2019 | Lee |
| 2019/0392672 | A1 | 12/2019 | Idris |
| 2020/0042137 | A1 | 2/2020 | Kano |
| 2020/0111285 | A1 | 4/2020 | Phillips, Jr. |
| 2020/0111328 | A1 | 4/2020 | Bland |
| 2020/0133331 | A1 | 4/2020 | Ferris |
| 2020/0193767 | A1 | 6/2020 | Jadeja |
| 2021/0027574 | A1 | 1/2021 | Rodriguez |

OTHER PUBLICATIONS

Aristocrat Helix, date not available, [retrieved Sep. 26, 2021], Retrieved from Internet, URL: https://www.prosperitygaming.eu aristocrat-1/aristocrat-helix> (Year: 2021).

Aristocrat Introduces All-New Buffalo Grand Slot Machine, Aug. 3, 2015, [retrieved Sep. 26, 2021], Retrieved from Internet, URL: <https: Vwww.vegasnews.com/139410/aristocrat-introduces-all-new-buffalo-grand-slot-machine.html> (Year: 2015).

Aristocrat Leisure Hopes Its Bets Pay Off, Aug. 25, 2013, [retrieved Sep. 26, 2021], Retrieved from Internet, URL: <https://www.wsj.com/ articles/SB10001424127887323665504579028420024314700> (Year: 2013).

Aristocrat's Dragon Link Showing Much Eastern and Western Promise, Jan. 31, 2018, [retrieved Sep. 26, 2021], Retrieved from Internet, URL:<https://www.casinolifemagazine.com/news/aristocrat%E2%80%99s-dragon-link%E2%84%A2- showing-much-eastemn-and-westem-promise> (Year:2018).

Aristocrat's All-new Edge XT. Jul. 3, 2019, [retrieved Sep. 26, 2021], Retrieved from Internet, URL: <https://markets.businessinsider.com/news/stocks/(aristocrat-s-all-new-edge-x-cabinet-now-appearing-in-casinos-nationwide-with-launch-titles-farmville%E2%80%A6> (Year:2019).

Helix slant cabinet—Aristocrat Leisure Ltd, May 13, 2014, [retrieved Sep. 26, 2021], Retrieved from Internet, URL: <https://www.ggrasia.com/helix-slant-cabinet-aristocrat-leisure-ltd/> (Year: 2014).

Office Action dated Oct. 28, 2020 for U.S. Appl. No. 29/672,326 (pp. 1-7).

Office Action dated Oct. 28, 2020 for U.S. Appl. No. 29/672,327 (pp. 1-7).

Office Action dated Oct. 28, 2020 for U.S. Appl. No. 29/672,329 (pp. 1-7).

Notice of Allowance dated Jan. 8, 2021 for U.S. Appl. No. 29/672,326 (pp. 1-5).

Notice of Allowance dated Jan. 11, 2021 for U.S. Appl. No. 29/672,327 (pp. 1-5).

Notice of Allowance dated Jan. 8, 2021 for U.S. Appl. No. 29/672,329 (pp. 1-5).

Office Action dated Jan. 25, 2021 for U.S. Appl. No. 29/673,951 (pp. 1-9).

Aristocrat Helix, date not available, [retrieved Jan. 7, 2021], Retrieved from Internet, URL: <https://www.prosperitygaming.eu/ aristocrat-1/aristocrat-helix> (Year: 2020).

Helix X, date not available, [retrieved Jan. 7, 2021], Retrieved from Internet, URL: <https://www.aristocrat.com/anz/products-services/cabinets/#helix-x> (Year: 2020).

Helix slant slot cabinets—ARISTOCRAT TECHNOLOGIES, May 22, 2014, [retrieved Jan. 7, 2021], Retrieved from Internet, URL: <https://www.casinojournal.com/articles/88977-helix-slant-slot-cabinetsaristocrat-technologies> (Year: 2014).

Notice of Allowance dated Mar. 8, 2021 for U.S. Appl. No. 29/672,326 (pp. 1-6).

Notice of Allowance dated Mar. 8, 2021 for U.S. Appl. No. 29/672,327 (pp. 1-6).

Notice of Allowance dated Mar. 17, 2021 for U.S. Appl. No. 29/672,329 (pp. 1-6).

Notice of Allowance dated Apr. 6, 2021 for U.S. Appl. No. 29/673,951 (pp. 1-8).

Corrected Notice of Allowability dated Apr. 27, 2021 for U.S. Appl. No. 29/672,326 (pp. 1-2).

Corrected Notice of Allowability dated Apr. 27, 2021 for U.S. Appl. No. 29/672,327 (pp. 1-2).

Corrected Notice of Allowability dated Apr. 27, 2021 for U.S. Appl. No. 29/672,329 (pp. 1-2).

Corrected Notice of Allowability dated May 26, 2021 for U.S. Appl. No. 29/673,951 (pp. 1-4).

Notice of Allowance dated Dec. 8, 2021 for U.S. Appl. No. 29/788,408 (pp. 1-9).

Office Action (Non-Final Rejection) dated Feb. 16, 2022 for U.S. Appl. No. 16/946,664 (pp. 1-5).

Office Action dated Nov. 1, 2019, for U.S. Appl. No. 16/209,900 (pp. 1-14).

Notice of Allowance dated Apr. 22, 2020 for U.S. Appl. No. 16/209,900 (pp. 1-11).

Corrected Notice of Allowability dated Jul. 1, 2020 for U.S. Appl. No. 16/209,900 (pp. 1-2).

US Unpublished U.S. Appl. No. 29/673,950, filed Dec. 18, 2018, Inventor Jadeja.

Office Action dated Jan. 10, 2020, for U.S. App. No. 16/224,661 (pp. 1-16).

Notice of Allowance dated Apr. 20, 2020 for U.S. Appl. No. 16/224,661 (pp. 1-8).

U.S. Office Action dated Apr. 30, 2020 for U.S. Appl. No. 29/673,951 (pp. 1-12).

LG OLED displays to feature smartphone style curved edges?, (C) 2019 [online], [retrieved Apr. 16, 2020], Retrieved from internet, URL: <https://www.avforums.com/news/lg-oled-displays-to-feature-smartphone-style-curved-edges. 16774> (Year: 2019).

Oppo shows off 'waterfall screen' phone with ultra-curved edges, (C) 2019 [online], [retrieved Apr. 16, 2020], Retrieved from internet, URL: https://www.theverge.conn/circuitbreaker/2019/7/29/8934593/oppo-waterfall-display-phone-curved-screen-announced> (Year: 2019).

Notice of Allowance dated Jun. 24, 2020 for U.S. Appl. No. 16/224,661 (pp. 1-5).

Office Action dated Jul. 24, 2020 for U.S. Appl. No. 29/673,951 (pp. 1-9).

Office Action (Notice of Allowance and Fees Due (PTOL-85)) dated May 18, 2022 for U.S. Appl. No. 16/946,664 (pp. 1-8).

Office Action dated Mar. 15, 2023 for U.S. Appl. No. 29/792,423 (pp. 1-11).

Flat VS Curved Screens, Mar. 24, 2019, [retrieved Mar. 7, 2023], Retrieved from Internet, URL: <https://wattintegration.com/ flat-vs-curved-screens-1-2/> (Year: 2019).

Samsung to introduce curved display smartphone', Sep. 24, 2013, [retrieved Mar. 7, 2023], Retrieved from Internet, URL: <https://

(56) References Cited

OTHER PUBLICATIONS www.theverge.com/2013/9/24/4768264/samsung-shows-off-working-curved-screen-smartphone>(Year 2013).

The most outstanding curved monitors, Dec. 16, 2021, [retrieved Mar. 7, 2023], Retrieved from Internet, URL: <https://thegadgetflow.com/blog/most-outstanding-curved-monitors-you-can-buy-home-office/>(Year: 2021).

Top 5 Reasons to Buy a Curved PC Monitor, Jul. 25, 2018, [retrieved Mar. 7, 2023], Retrieved from Internet, URL: <https://www.hp.com/us-en/shop/tech-takes/5-reasons-to-buy-curved-pc-monitor>(Year: 2018).

Office Action dated Nov. 22, 2023 for U.S. Appl. No. 29/792,423 (pp. 1-11).

* cited by examiner

CURVED BUTTON DECK DISPLAY

CROSS-REFERENCE TO RELATED APPLICATIONS

This application claims priority to, and is a continuation of, U.S. patent application Ser. No. 16/209,900, entitled "CURVED BUTTON DECK DISPLAY" and filed on Dec. 4, 2018, which is hereby incorporated by reference and for all purposes. This application is related to U.S. patent application Ser. No. 29/672,326, entitled "CURVED BUTTON PANEL DISPLAY FOR AN ELECTRONIC GAMING MACHINE" and filed on Dec. 4, 2018, to U.S. patent application Ser. No. 29/672,327, entitled "CURVED BUTTON PANEL DISPLAY FOR AN ELECTRONIC GAMING MACHINE" and filed on Dec. 4, 2018, and to U.S. patent application Ser. No. 29/672,329, entitled "CURVED BUTTON PANEL DISPLAY FOR AN ELECTRONIC GAMING MACHINE" and filed on Dec. 4, 2018, all of which are hereby incorporated by reference and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A button deck for an EGM may have a display system that includes one or more curved display portions. A curved display portion may be curved along an axis that is substantially horizontal when the button deck module is coupled to an EGM. In some examples, a curved display portion may reside along a side of the button deck module that is near (or touching) a player when the button deck module is in use. In some examples, a curved display portion may be proximate a gaming machine display or a player tracking module when the button deck module is coupled to the EGM. (The terms "player tracking" and "player loyalty" are used synonymously herein.) The curvature of a curved display portion may match the curvature of a gaming machine display device. At least a portion of the button deck may be configured to display images corresponding to a game theme and/or an attract sequence.

The button deck module may, in some examples, include a sensor system that is configured for touch and/or gesture detection. The button deck module may be configured to control the display system to display one or more images corresponding to force, pressure and/or movement detected by the sensor system. The button deck module may, in some examples, include a haptic feedback system. The haptic feedback system may be configured to provide haptic feedback corresponding to one or more touches or gestures detected via the sensor system.

In some examples, the button deck may provide at least some functionality of a player loyalty system. In some instances, the button deck may include an interface system that is configured to receive player identification information, e.g., a player loyalty card reader.

DETAILED DESCRIPTION

Figure 1:
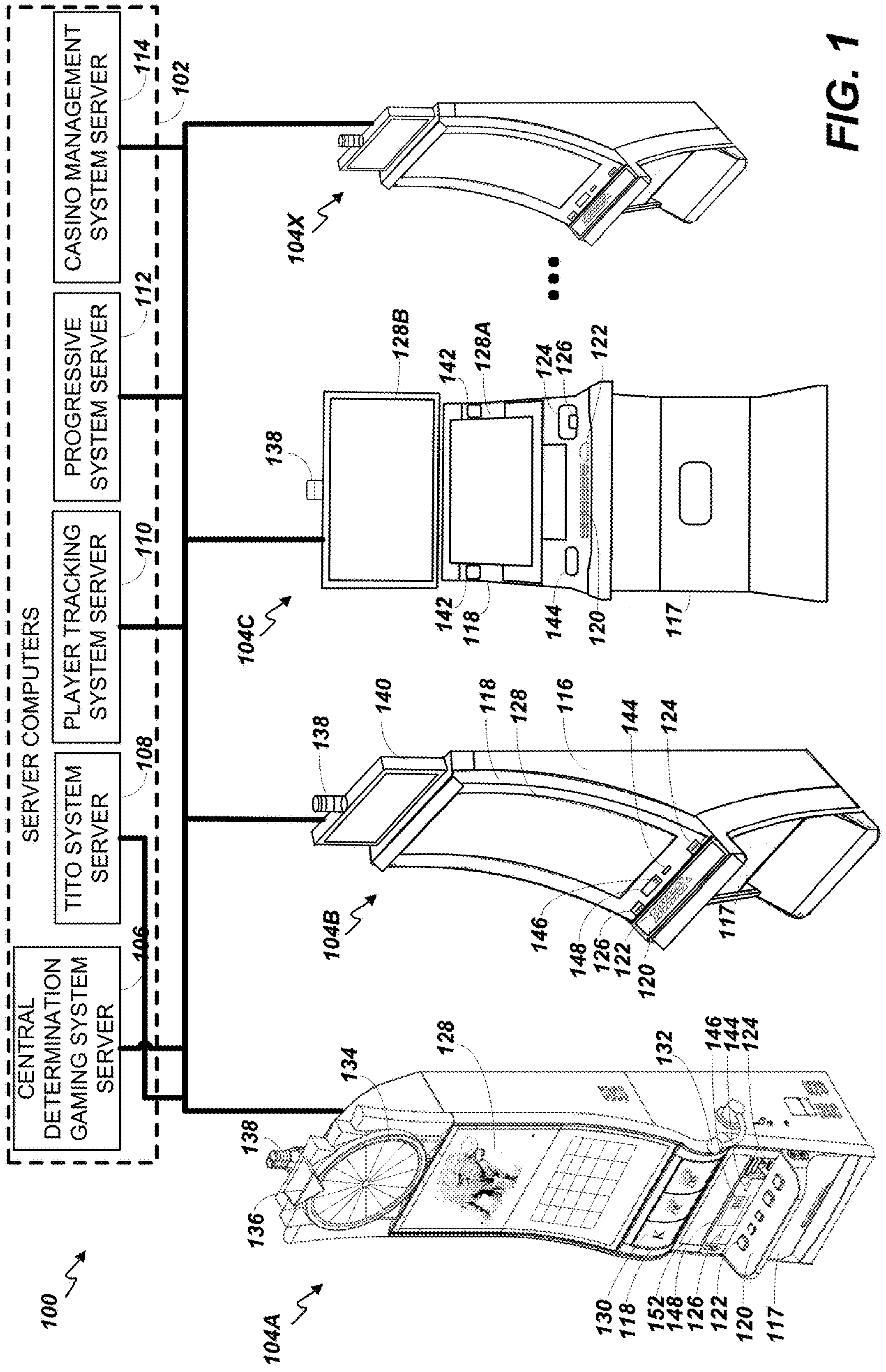
FIG. 1 is a diagram showing examples of several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 1048 or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
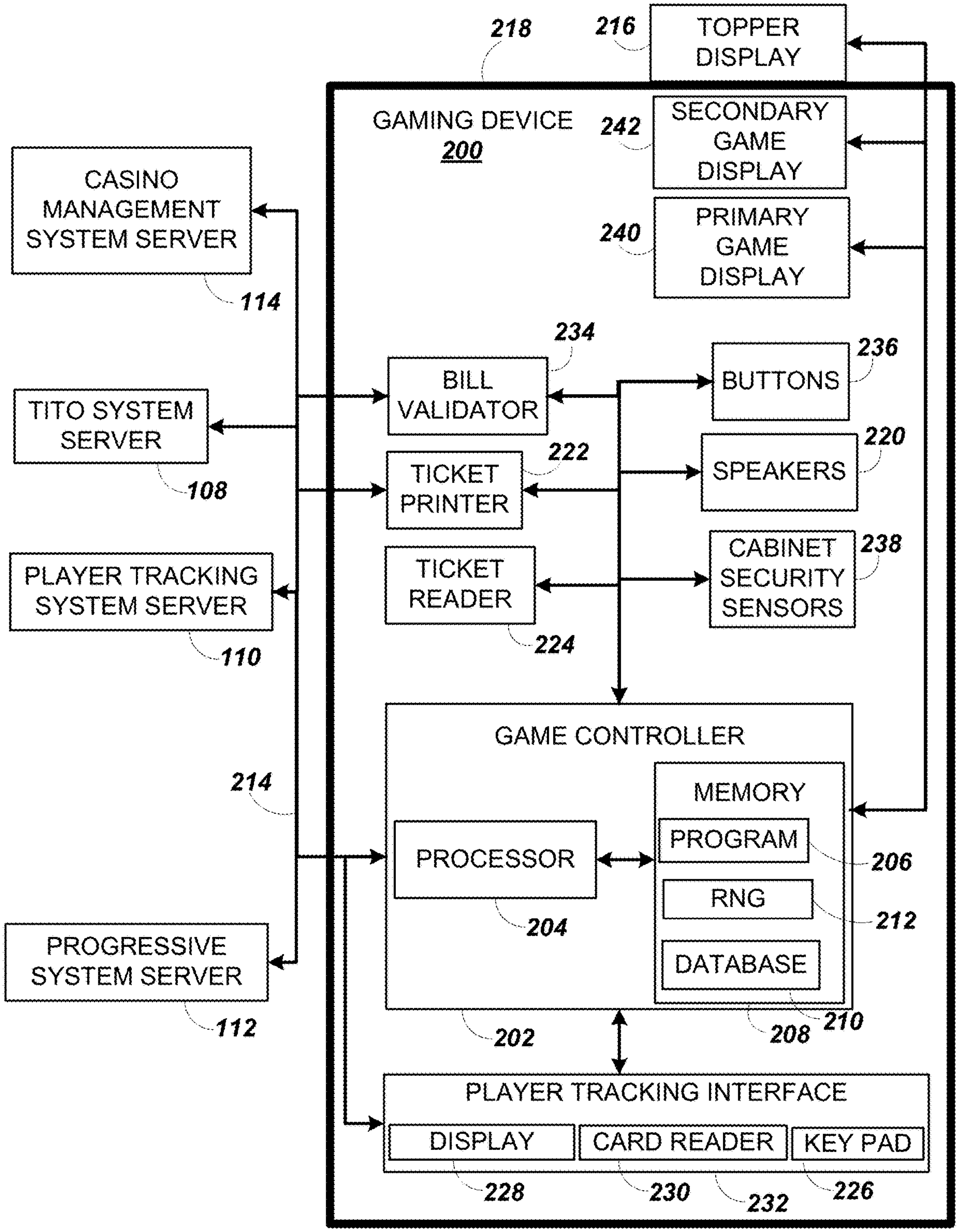
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen

140 may also or alternatively be used to display progressive jackpot prizes available to a player during play of gaming device 104B.

Example gaming device 104B includes a main cabinet 116 including a main door 117 which opens to provide access to the interior of the gaming device 1048. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 1288 is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
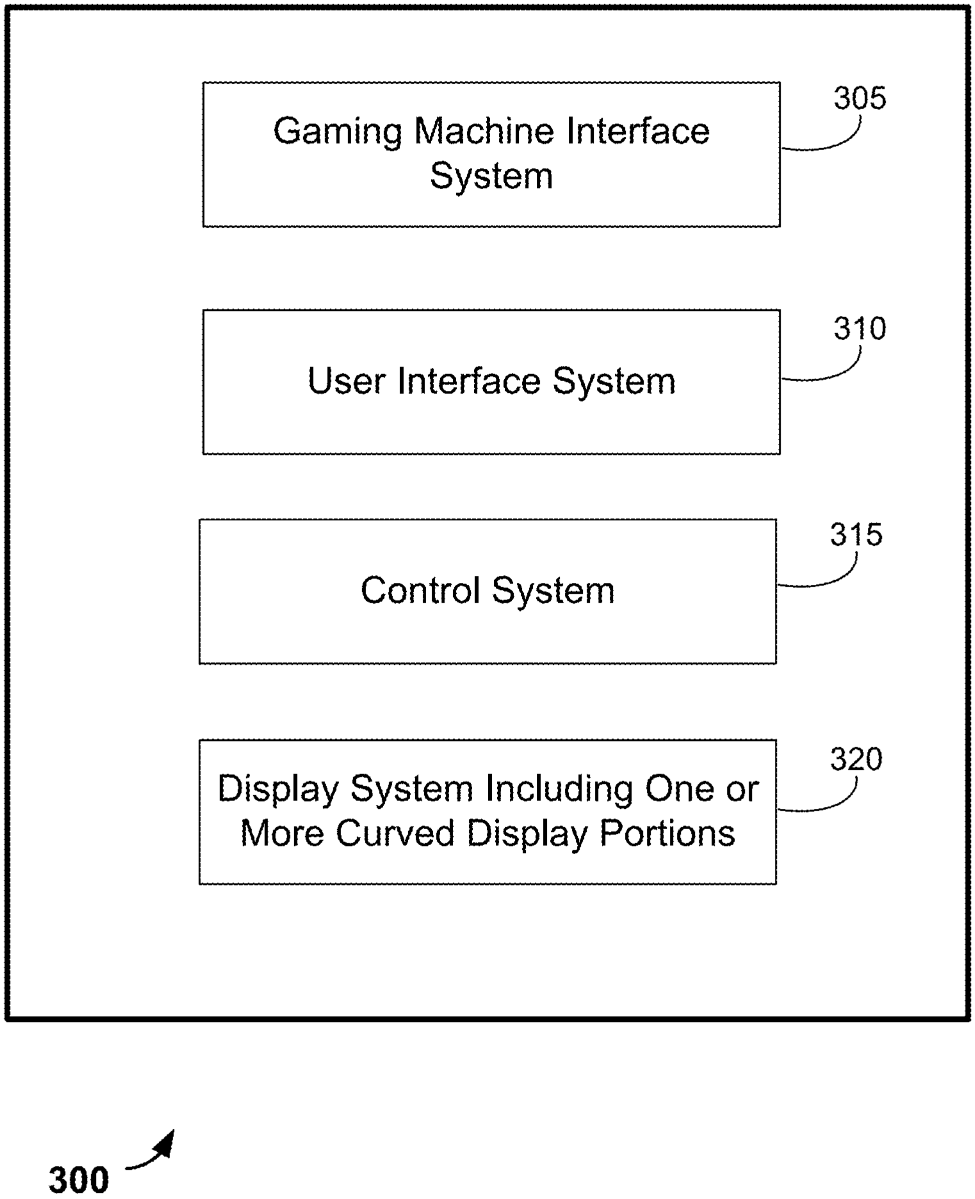
FIG. 3 is a block diagram that shows blocks of a button deck module according to one example.

FIG. 3 is a block diagram that shows blocks of a button deck module according to one example. According to this example, the button deck module 300 includes a gaming machine interface system 305, a user interface system 310, a control system 315 and a display system 320. The gaming machine interface system 305 provides one or more interfaces for wired and/or wireless communications between the button deck module 300 and an EGM, e.g., by electrical connectivity. In this implementation, the gaming machine interface system 305 is configured for communication between the button deck module 300 and at least a portion of a gaming machine control system. The gaming machine control system may be, or may include, an instance of the game controller 202 described above with reference to FIG. 2.

In this example, the user interface system 310 is configured for receiving user input. The user interface system 310 may, in some examples, include one or more physical buttons, trackballs, sliders, cameras, thermal sensors, etc. In some examples that are described in more detail below, the user interface system 310 may include a sensor system that is configured for touch and/or gesture detection. For example, the user interface system 310 may include a capacitive, resistive, optical and/or ultrasonic sensor that is configured for touch and/or gesture detection. In some examples, the sensor system may include a screen, such as a touch screen, that overlies at least a portion of the display system 320. According to some examples, the sensor system may include one or more touch- or gesture-sensitive buttons. The button deck module 300 may, in some examples, include a haptic feedback system. The haptic feedback system may be configured to provide haptic feedback corresponding to one or more touches or gestures detected via the sensor system. Some examples are described in more detail below.

In some instances, the user interface system 310 may include a wired or wireless interface. For example, the user interface system 310 may include a wireless interface that is configured for radio frequency communication, infrared communication, near-field magnetic communication, etc. In some implementations, the user interface system 310 may be configured to receive player identification information.

According to some such implementations, the user interface system 310 may include a player loyalty card reader. In some such examples, the control system may be configured to control at least a portion of the display system 320 (e.g., at least one curved display portion) to display one or more images corresponding to player loyalty information.

Such implementations have potential advantages over some previously-deployed player loyalty systems. For example, some previously-deployed player loyalty systems are configured to cause a main display of an EGM (such as the main display 128 shown in FIG. 1) to display images corresponding to player loyalty information. Such previously-deployed player loyalty system implementations may not be entirely desirable from a game design perspective, because the images corresponding to player loyalty information are often displayed in windows that are created by reducing the area of the main display that is used to display a game. By instead controlling at least a portion of the display system 320 of the button deck module 300 (e.g., one or more curved display portions) to display images corresponding to player loyalty information, it is not necessary to reduce the area of the main display that is used to display a game. However, in alternative implementations, an EGM may include a player loyalty module that is separate from the button deck module 300, e.g., as described above with reference to FIG. 1 and FIG. 2.

The control system 315 may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, the control system 315 may include one or more processors. In some implementations the control system may include one or more non-transitory storage media operatively coupled to the one or more processors. In this example, the control system 315 is configured for sending user input signals, via the gaming machine interface system, to the gaming machine control system 305.

In this implementation, the display system 320 includes one or more curved display portions. For example, the curved display portion(s) may include a first curved display portion that is curved relative to an axis that is substantially horizontal when the button deck module is coupled to the gaming machine. According to some examples, at least a portion of the display system 320 (e.g., one or more curved display portions) may be configured to display images corresponding to a game theme and/or an attract sequence, e.g., an attract sequence for a game.

Figure 4:
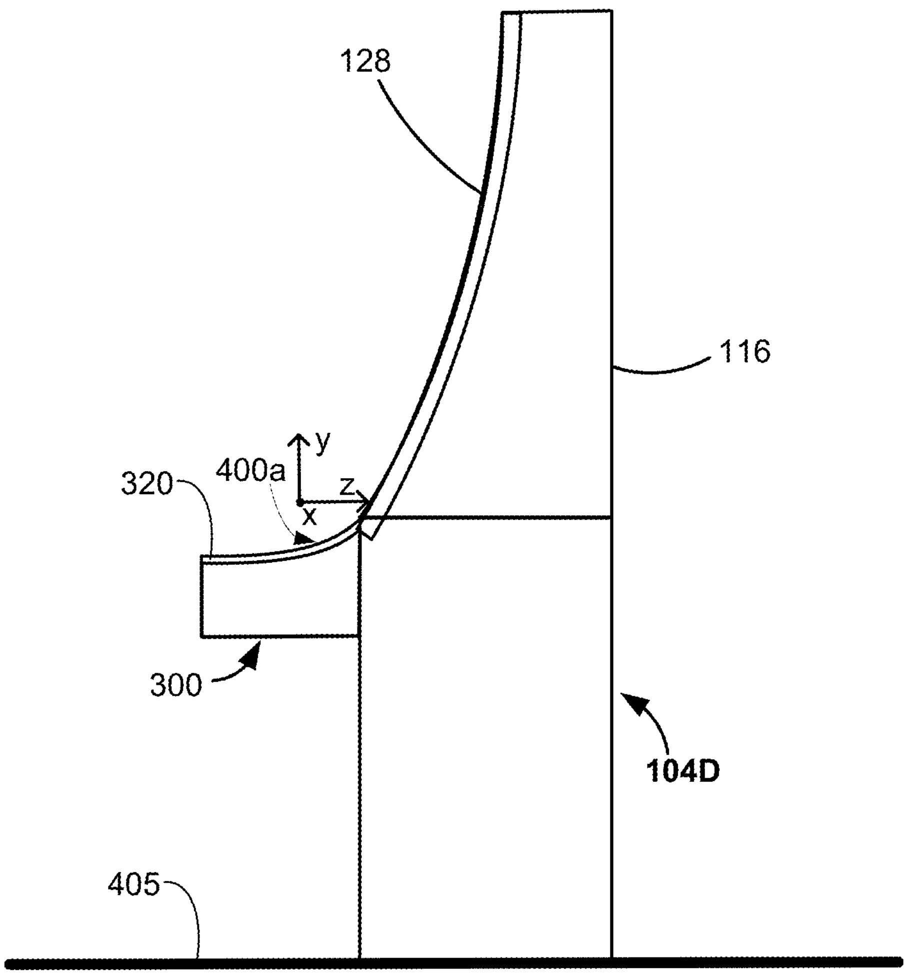
FIG. 4 shows an example of a cutaway view through a button deck module that is attached to an EGM.

FIG. 4 shows an example of a cutaway view through a button deck module that is attached to an EGM. In this example, the button deck module 300 includes a display system 320 having a curved display portion 400*a*. According to this example, the curved display portion 400*a* is a concave display portion that is configured to be proximate the main gaming machine display 128 when the button deck module 300 is coupled to an EGM. In this example, the curved portion 400*a* extends across the entire width of the button deck module 300 (along the x axis that is shown in FIG. 4.) However, in alternative implementations, the curved portion 400*a* may extend across only a portion of the width of the button deck module 300, e.g., half of the width, one third of the width, two thirds of the width, one quarter of the width, etc.

As noted above, the main display 128 may be, or may include, a high-resolution liquid crystal display (LCD), plasma, light-emitting diode (LED), or organic light-emitting diode (OLED) panel. According to some such implementations, the main gaming machine display 128 may be, or may include, a plasma display or other display that is subject to image persistence, which is commonly referred to as "burn in." In some such examples, the display system 320 includes at least one display portion that is relatively less subject to burn in, such as at least one LCD portion or at least one OLED portion. According to some implementations, the display system 320 includes a flexible OLED.

According to some such implementations, the button deck module 300 may provide at least some functionality of a player tracking module. For example, the button deck module 300 may include a player loyalty card reader. In some such examples, a control system of the button deck module 300 may be configured to control at least a portion of the display system 320 (e.g., at least the curved display portion 400*a*) to display one or more images corresponding to player loyalty, or other, information.

However, in other implementations the EGM 104D may include a player tracking module that is separate from the button deck module 300. According to some such implementations, the curved display portion 400*a* may be configured to be proximate the player tracking module when the button deck module 300 is coupled to an EGM.

FIG. 4 shows an example of a coordinate system in which the z axis is vertical, relative to the horizontal floor 405 upon which the EGM 104D resides. The x and z axes are disposed in a plane that is parallel, or substantially parallel, to the floor 405. In this example, the curved display portion 400*a* is curved relative to the x axis.

In some implementations, e.g., as shown in FIG. 4, the curvature of the curved display portion 400*a* matches, or substantially matches, at least a portion of the curvature of the main gaming machine display 128 (e.g., the curvature of a portion of the main gaming machine display 128 that is proximate or adjacent to the button deck module 300). In addition to being aesthetically pleasing, some such implementations may provide potentially advantageous functionality. For example, in some implementations wherein the button deck module 300 includes a sensor system that is configured for touch and/or gesture detection, a control system of the button deck module 300 may be configured to control the display system 320 to display one or more images corresponding to a movement detected by the sensor system. The movement may, in some instances, be a player hand movement or a player digit movement. In some examples, a control system of the button deck module 300 may be configured to determine a trajectory corresponding to the movement detected by the sensor system and to control at least a portion of the display system 320 (e.g., at least the curved display portion 400*a*) to display the one or more images moving along the trajectory. The control system may be configured to send, via the gaming machine interface system 305, trajectory information to at least a portion of the gaming machine control system. The trajectory information may include information for controlling a gaming machine display device (such as the main display 128 shown in FIG. 4) to display one or more images moving along the trajectory corresponding to the movement detected by the sensor system. Having the button deck module 300 proximate the main display 128 and having the curvature of the curved display portion 400*a* match, or substantially match, the curvature of the main gaming machine display 128 allows the button deck module 300 and the main display 128 to simulate a smooth, substantially continuous motion of a displayed object moving from the button deck module 300 to the main display 128 or vice versa. Some examples are described in more detail below and are illustrated in other disclosed figures.

Figure 5A:
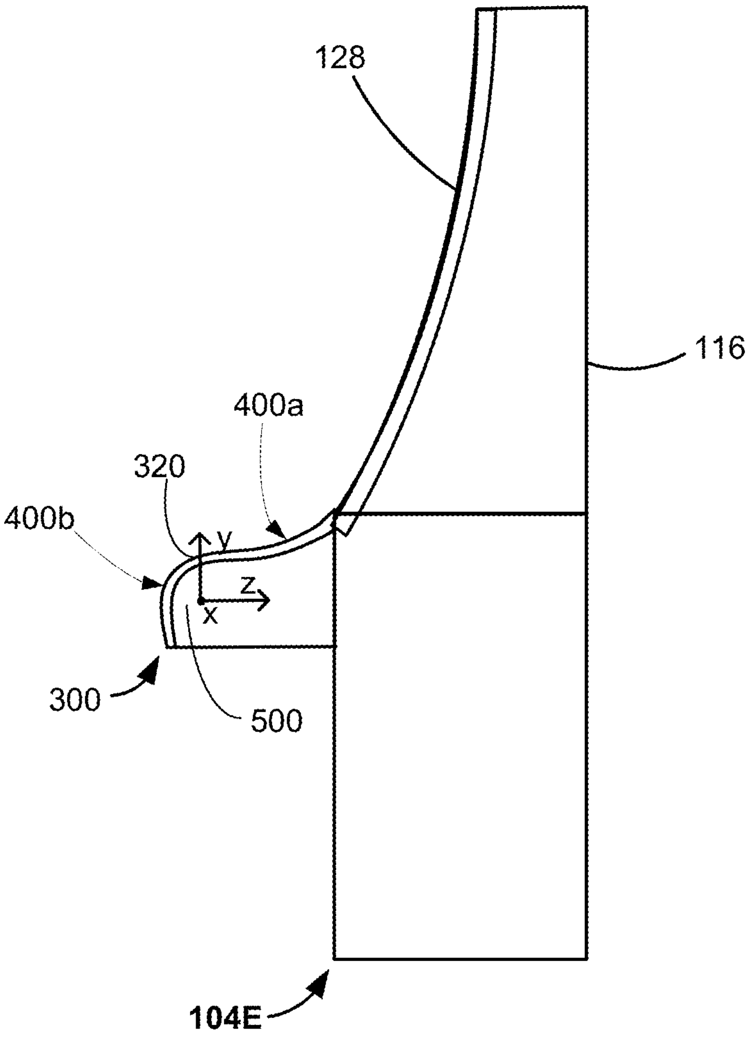
FIG. 5A shows an alternative example of a cutaway view through a button deck module that is attached to an EGM.
Figure 5B:
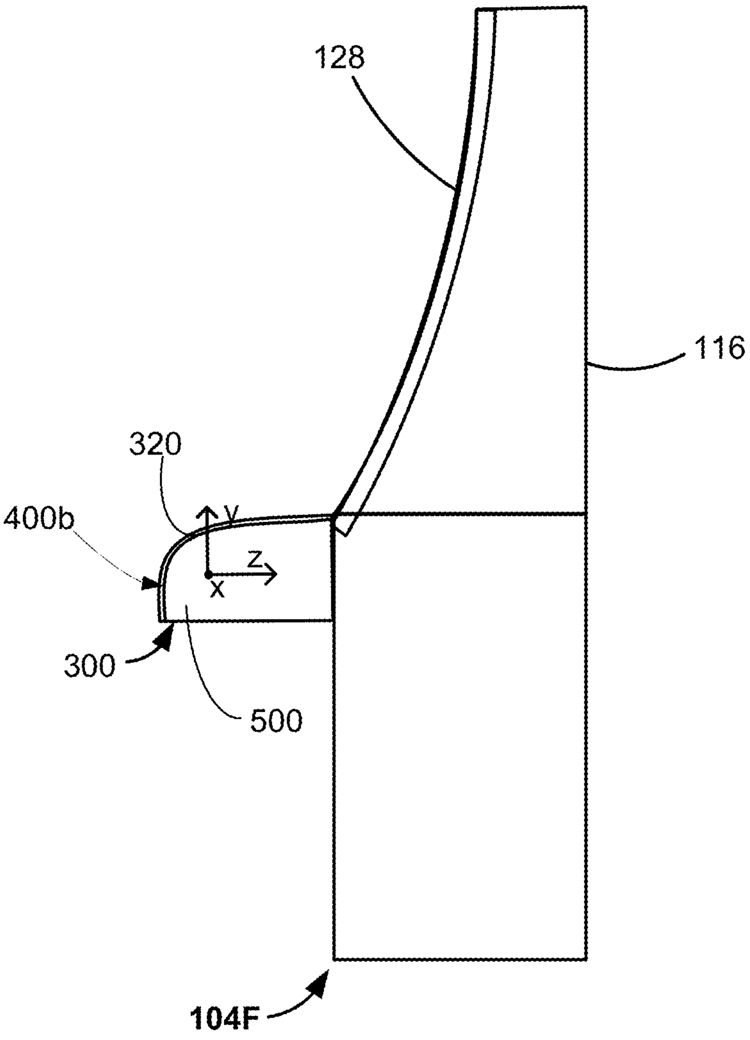
FIG. 5B shows another alternative example of a cutaway view through a button deck module that is attached to an EGM.

FIG. 5A shows an alternative example of a cutaway view through a button deck module that is attached to an EGM. In this example, the button deck module 300 includes a curved display portion 400*a* that is similar to that shown in FIG. 4, as well as a curved display portion 400*b* that resides along a side of the button deck module 300 that is near (or touching) a player when the button deck module 300 is in use. In this example, the curved portions 400*a* and 400*b* extend across the entire width of the button deck module 300 (along the x axis that is shown in FIG. 5B.) However, in alternative implementations, the curved portion 400*a* and/or the curved portion 400*b* may extend across only a portion of the width of the button deck module 300, e.g., half of the width, one third of the width, two thirds of the width, one quarter of the width, etc. In this example, the curved display portion 400*b* provides an additional area for displaying images corresponding to a game theme, images corresponding to player loyalty information, images corresponding to an attract sequence, images corresponding to a user input system, etc., relative to the area of the area of the display system 320 that is shown in FIG. 4.

FIG. 5B shows another alternative example of a cutaway view through a button deck module that is attached to an EGM. In this example, the button deck module 300 does not include a curved display portion 400*a* like that shown in FIGS. 4 and 5A. However, in this example, the button deck module 300 includes a curved display portion 400*b* that resides along a side of the button deck module 300 that is near (or touching) a player when the button deck module 300 is in use. Like the example shown in FIG. 5A, the curved display portion 400*b* provides an additional area for displaying images corresponding to a game theme, images corresponding to player loyalty information, images corresponding to an attract sequence, images corresponding to a user input system, etc., relative to the area of the area of the display system 320 that is shown in FIG. 4. In this example, the curved portion 400*b* extends across the entire width of the button deck module 300. However, in alternative implementations, the curved portion 400*b* may extend across only a portion of the width of the button deck module 300, e.g., half of the width, one third of the width, two thirds of the width, one quarter of the width, etc.

In the implementations shown in FIGS. 5A and 5B, the curved display portion 400*b* provides a convenient location for displaying virtual control device images that correspond to virtual control devices, such as virtual buttons. For example, in some implementations wherein the button deck module 300 includes a sensor system that is configured for touch and/or gesture detection, a control system of the button deck module 300 may be configured to control the display system 320 to display one or more images corresponding to force, pressure and/or movement detected by the sensor system in the curved display portion 400*b* or in another portion of the button deck module 300. The images may, in some instances, correspond with a simulated movement of a virtual control device. In some example, a sensor system of the button deck module 300 may include a camera or an infrared sensor. According to some such examples, a control system of the button deck module 300 may be configured to control the display system 320 to display one or more images corresponding to movement detected by the camera or an infrared sensor.

In some implementations, the sensor system that is configured for touch and/or gesture detection may extend, at least in part, along one or more side portions 500 of the button deck module 300. The control system may configured to control the display system 320 to display one or more images corresponding to movement of one or more virtual control devices in response to the force, pressure and/or movement detected by a portion of the sensor system that extends, at least in part, along one or more side portions 500 of the button deck module 300. In some such examples, control system may configured to control the display system 320 to display one or more virtual control device images corresponding to virtual buttons, virtual pinball-type flippers, etc., in response to the force, pressure and/or movement detected by a portion of the sensor system that extends, at least in part, along one or more side portions 500 of the button deck module 300. The button deck module 300 may, in some examples, include a haptic feedback system. The haptic feedback system may be configured to provide haptic feedback corresponding to one or more touches or gestures detected via the sensor system, including but not limited to touches or gestures corresponding to interaction with virtual control device images. Some examples are described below.

Figure 6:
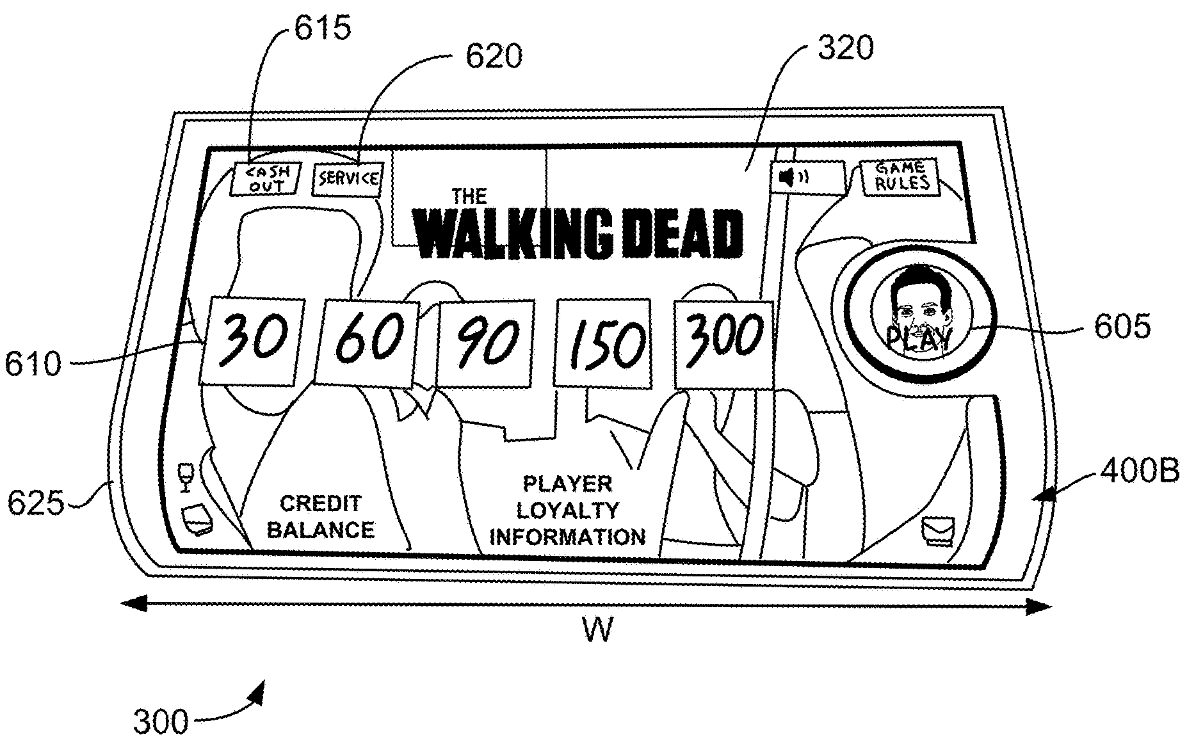
FIG. 6 shows an alternative implementation of a button deck module.

FIG. 6 shows an alternative implementation of a button deck module. In this example, the button deck module 300 includes a curved portion 400*b*, which resides along a side of the button deck module that is proximate a player when the button deck module 300 is in use. Accordingly, the game theme images and other images that are displayed on the display system 320 are oriented to face a player in this position. In this example, the curved portion 400*b* extends across the entire width W of the button deck module 300. However, in alternative implementations, the curved portion 400*b* may extend across only a portion of the width W of the button deck module 300, e.g., half of the width, one third of the width, two thirds of the width, one quarter of the width, etc. In this implementation, the button deck module 300 includes a physical button, which is configured as a play button in this example. Other implementations of the button deck module 300 may include no physical buttons, additional physical buttons, physical buttons of different shapes and/or sizes, etc.

In this example, the button deck module 300 includes a touch screen that is disposed over at least a portion of the display system 320. According to this implementation, a control system of the button deck module 300 is configured to control the display system 320 to display images corresponding to wager level buttons 610, cash out button 615, service button 620 and other virtual buttons of a user input system. The button deck module 300 is configured to receive user input from the virtual buttons according to signals corresponding to touch indications received from corresponding areas of the touch screen. In some implementations, a control system of the button deck module 300 is configured to control the display system 320 to display other game-related or player-related information, such as player loyalty information, credit balance information, etc.

According to this implementation, a control system of the button deck module 300 is configured to control the display system 320 such that the peripheral area 625 provides a multi-colored border that changes over time. Such implementations have the potential advantage of avoiding the need for LEDs and/or other types of lighting to be embedded in the periphery of the button deck module 300. In some implementations, the control system may be configured to control at least the peripheral area 625 of the display system 320, and in some instances other areas of the display system 320, to provide an attract sequence.

Alternatively, or additionally, in some implementations the control system may be configured to the display system 320 to provide an attract sequence that involves displaying personal information, such as a person's name, that is obtained via a player loyalty system. For example, the player loyalty system may be configured to read a player loyalty card (e.g., a radio frequency identification (RFID) card), to receive player loyalty account information from a smart phone or another type of mobile device via a wireless interface (such as a Bluetooth™ or other near-field wireless interface), etc., when a player is in the vicinity of an EGM that includes, or is configured for communication with, the button deck module 300. The player loyalty system may or may not be incorporated into the button deck module 300, depending on the particular implementation. However, a control system of the button deck module 300 may be configured to receive the player loyalty account information from the player loyalty system, to extract personal information from the player loyalty account information and to control the display system 320 to provide an attract sequence that involves displaying at least some of the personal information, such as the person's name. In some examples, a control system of the button deck module 300 may be configured to receive the player loyalty account information from the player loyalty system and to extract other player loyalty account information, such as information regarding a person's level and/or status in a casino's player loyalty program. According to some such examples, the control system may be configured to control the display system 320 to indicate one or more colors, symbols, etc., that correspond with the level and/or status in the player loyalty program. For example, if a player has attained a platinum level player in the player loyalty program, in some such implementations the control system may be configured to control the display system 320 to display a platinum color on at least a portion of the display system 320, e.g., in a border area such as the peripheral area 625 that is shown in FIG. 6.

Figure 7:
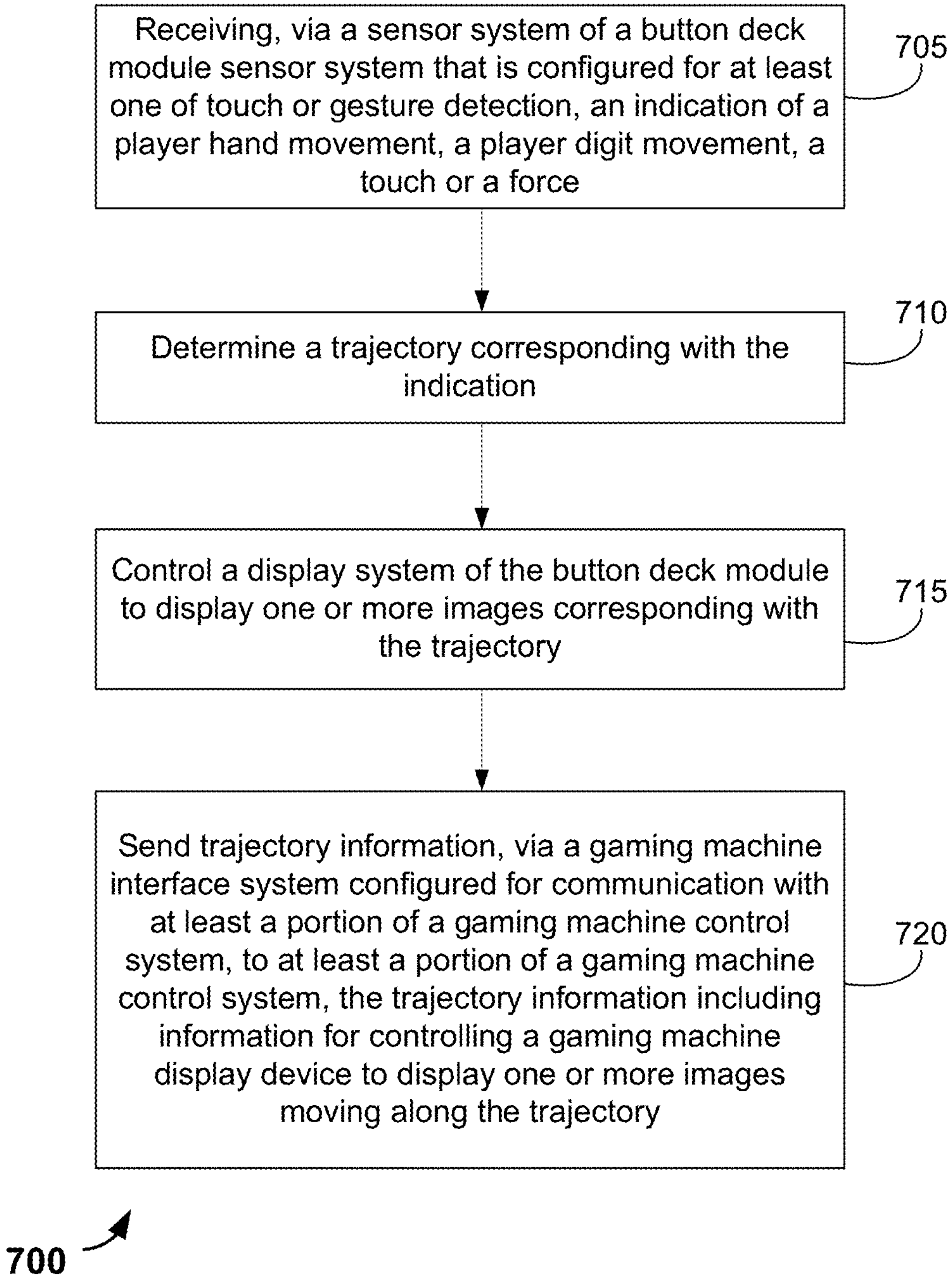
FIG. 7 is a flow diagram that shows blocks of a method according to one implementation.

FIG. 7 is a flow diagram that shows blocks of a method according to one implementation. Method 700 may be implemented, at least in part, by a button deck module 300 as disclosed herein. In some examples, methods performed by the button deck module 300 may be implemented, at least in part, by a control system (such as the control system 315 that is described above with reference to FIG. 3) according to software stored upon one or more non-transitory storage media of, or accessible by, the control system. As with other methods described herein, the number and sequence of blocks shown in FIG. 7 are merely examples. Similar disclosed methods may include more or fewer blocks. Moreover, at least some of the blocks may occur in a different sequence than the sequence that is shown in a flow diagram.

According to this example, block 705 involves receiving, via a sensor system of a button deck module sensor system that is configured for at least one of touch or gesture detection, an indication of a player hand movement or a player digit movement. Alternatively, or additionally, block 705 may involve detecting user input such as a touch, force or pressure changes, etc., detected by the sensor system.

Here, block 710 involves determining a trajectory corresponding with the player hand or digit movement. Alternatively, or additionally, block 710 may involve determining a trajectory corresponding with user input such as a touch, force or pressure changes, etc., detected by the sensor system. In this example, block 715 involves controlling a display system of the button deck module to display one or more images corresponding with the trajectory.

According to the example shown in FIG. 7, block 720 involves sending trajectory information, via a gaming machine interface system configured for communication with at least a portion of a gaming machine control system, to at least a portion of a gaming machine control system. In this example, the trajectory information includes information for controlling a gaming machine display device to display one or more images moving along the trajectory corresponding to the movement detected by the sensor system.

Figure 8:
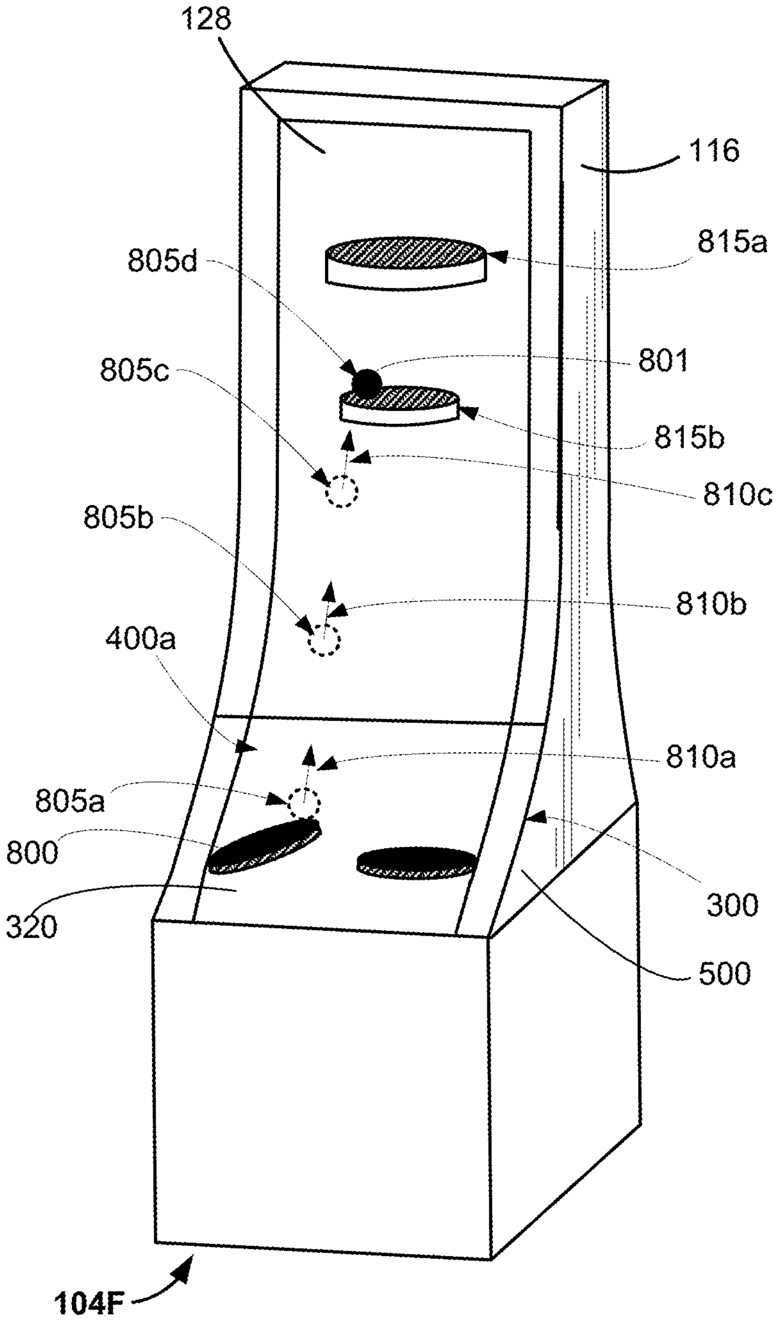
FIG. 8 shows an example of a button deck module that is configured to perform the method of FIG. 7.

FIG. 8 shows an example of a button deck module that is configured to perform the method of FIG. 7. In this implementation, the button deck module 300 includes a curved display portion 400*a* that is configured to reside adjacent to the main display 128. In this example, the curved display portion 400*a* has a curvature that matches, or substantially matches, a curvature of a portion of the main display 128 that is adjacent to the button deck module 300. According to this example, the button deck module 300 includes a sensor system that is configured for touch detection. In this implementation, the sensor system is disposed on at least a portion of the display system 320 and on the side portions 500.

Here, a control system of the button deck module 300 is configured to control the display system 320 to display images corresponding to user input such as movement, a touch, force or pressure changes, etc., detected by the sensor system. In the example, shown in FIG. 8, the user input corresponds to a user's interaction with the sensor system to cause a simulated movement of virtual control devices, which are virtual paddles 800 in this example. Here, the control system of the button deck module 300 is configured to control the display system 320 to display images corresponding to corresponding to movement of virtual paddles 800 in response to the user input. Other implementations may provide other player-interactive game methods, which may involve one or more other types of virtual control devices.

According to this example, the button deck module 300 and the EGM 104F are configured to provide a skill-based game that is based, in part, on the method of FIG. 7. The skill-based game may, in some examples, be provided as a bonus game after a trigger event in a wagering game, such as a winning symbol or card combination. In this example, the skill-based game involves interacting with one or more of the virtual paddles 800 in order to attempt to shoot the ball 801 into the hole 815*a* or the hole 815*b*, which are displayed on the main display 128. The ball 801 is shown in FIG. 8 at time 805*d* with a solid color and a solid outline. Previous positions of the ball 801 at are shown at previous times 805*a*-805*c* with no fill and with a dashed outline. These previous positions are intended to represent instants in time during a presentation of images of the ball 801 traveling along a substantially continuous path represented on the display system 320 and the main display 128. For example, the path may be continuous except for the gap between the displays.

In this implementation, at a previous time 805*a* the display system 320 was controlled to show a virtual paddle 800 striking the ball 801. A control system of the button deck module 300 determined trajectory information corresponding with the trajectory represented by arrow 810*a*, including a speed and a direction, corresponding with a user's interaction with the virtual paddle 800 via input to the sensor system. For example, the input to the sensor system may have been the force applied by a user to an area of the sensor system. The control system of the button deck module 300 may have determined the trajectory information according to instructions, such as software, stored on one or more non-transitory media.

The button deck module 300 may, in some examples, include a haptic feedback system. The haptic feedback system may be configured to provide haptic feedback corresponding to force, touches, gestures, etc., detected via the sensor system, including but not limited to touches or gestures corresponding to interaction with virtual control device images. For example, in some implementations the haptic feedback system may be configured to provide haptic feedback corresponding to movement of the virtual paddles 800, contact of a virtual paddle 800 with the ball 801, etc.

In this example, the control system of the button deck module 300 transmitted the trajectory information 810*a*, via a gaming machine interface system, to the control system of the EGM 104F. The control system of the EGM 104F caused the main display 128 to display images of the ball 801 at time 805*b*, during which the trajectory represented by arrow 810*b* may have been substantially similar to the trajectory represented by arrow 810*a*. However, the speed corresponding with the trajectory represented by arrow 810*c* may have been slower, in order to simulate the effect of gravity operating on the ball 801. By the time 805*d*, the ball 801 has slowed enough to drop into the hole 815*b*. The control system of the EGM 104F may be configured to determine changes to the speed and/or direction of the ball 801 according to instructions, such as software, stored on one or more non-transitory media.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

The invention claimed is:

1. A gaming machine comprising:

a main cabinet;

a gaming machine display attached to the main cabinet; and a button deck module attached to the main cabinet, along a lower edge of the gaming machine display, the button deck module comprising:

a gaming machine interface system configured for communication with at least a portion of a gaming machine control system including one or more processors, wherein the gaming machine control system controls the gaming machine display, and wherein the gaming machine interface system includes one or more wired interfaces configured for electrical connectivity with the gaming machine control system;

a button deck module user interface system configured for receiving user input;

a button deck module control system including one or more processors and configured for sending user input signals, via the gaming machine interface system, to the gaming machine control system, wherein the button deck module control system is configured to send, via the gaming machine interface system, trajectory information to at least the portion of the gaming machine control system, the trajectory information including information for controlling a gaming machine display device to display one or more images moving along the trajectory; and a button deck module display system including a curved display portion that is curved along an axis, the axis being horizontal when the button deck module is coupled to the main cabinet, the curved display portion being a concave display portion that resides along a side of the button deck module that is proximate an adjacent portion of the gaming machine display when the button deck module is coupled to the main cabinet, a curvature of the curved display portion being the same as a curvature of the adjacent portion of the gaming machine display, such that the curved display portion and the gaming machine display may simulate a smooth, substantially continuous motion of a displayed object moving between the button deck module and the gaming machine display.

2. The gaming machine of claim 1, wherein the button deck module control system is configured to control the curved display portion to display images corresponding to a game theme.

3. The gaming machine of claim 1, wherein the button deck module control system is configured to control the curved display portion to display one or more images corresponding to a credit balance, one or more images corresponding to player loyalty information, or one or more images corresponding to the credit balance and the player loyalty information.

4. The gaming machine of claim 1, wherein at least one of the button deck module user interface system or the gaming machine interface system is configured to receive player loyalty information.

5. The gaming machine of claim 1, wherein the button deck module user interface system includes a player loyalty card reader.

6. The gaming machine of claim 1, wherein the button deck module user interface system comprises a button deck module sensor system that is configured for at least one of touch or gesture detection.

7. The gaming machine of claim 6, wherein the button deck module control system is configured to control the button deck module display system to display one or more images corresponding to a movement detected by the button deck module sensor system, the movement comprising at least one of a hand movement or a digit movement.

8. The gaming machine of claim 7, wherein the button deck module control system is configured to control at least the curved display portion to display the one or more images moving along a trajectory corresponding to the movement detected by the button deck module sensor system.

9. The gaming machine of claim 7, wherein the button deck module control system is configured to control the button deck module display system to display one or more images corresponding to movement of one or more virtual control devices in response to the movement detected by the button deck module sensor system.

10. The gaming machine of claim 6, further comprising a button deck module haptic feedback system, wherein the button deck module control system is configured to control the button deck module haptic feedback system to provide haptic feedback corresponding to one or more touches or gestures detected via the button deck module sensor system.

11. The gaming machine of claim 1, further comprising a second curved display portion, wherein the second curved display portion is a convex display portion that resides along a side of the button deck module that is proximate a player when the button deck module is in use.

12. The gaming machine of claim 11, wherein at least one of the curved display portion or the second curved display portion extends across only a portion of a width of the button deck module.

13. The gaming machine of claim 1, wherein the button deck module control system is configured to control the button deck module display system to display one or more images, one or more colors, or both images and colors corresponding to an attract sequence for a game.

14. The gaming machine of claim 13, wherein the attract sequence comprises one or more images, one or more colors, or both images and colors displayed around a periphery of the button deck module display system.

15. The gaming machine of claim 1, wherein at least one of the button deck module user interface system or the gaming machine interface system is configured to receive player loyalty information and wherein the button deck module control system is configured to control the button deck module display system to display one or more images, one or more colors, or both images and colors corresponding to at least a portion of the player loyalty information.

16. The gaming machine of claim 15, wherein the player loyalty information comprises information regarding a player's level in a player loyalty program and wherein the button deck module control system is configured to control the button deck module display system to display one or more images, one or more colors, or both images and colors corresponding to at least a portion of the player's level in the player loyalty program.

17. The gaming machine of claim 1, wherein the button deck module user interface system comprises one or more physical buttons configured to receive the user input.

18. The gaming machine of claim 1, wherein there is no input device between the curved display portion and the gaming machine display.

* * * * *